United States Patent
Ashworth et al.

(10) Patent No.: US 9,944,414 B2
(45) Date of Patent: Apr. 17, 2018

(54) SATELLITE TELEMETRY, TRACKING AND CONTROL DATA TRACKING AND ARCHIVING SYSTEM

(71) Applicant: ECHOSTAR SATELLITE SERVICES L.L.C., Englewood, CO (US)

(72) Inventors: Roger Ashworth, Cheyenne, WY (US); Joe Buss, Cheyenne, WY (US); Frank Zebre, Cheyenne, WY (US); Jerome Swanson, Cheyenne, WY (US)

(73) Assignee: ECHOSTAR SATELLITE SERVICES LLC, Englewood, CO (US)

( * ) Notice: Subject to any disclaimer, the term of this patent is extended or adjusted under 35 U.S.C. 154(b) by 218 days.

(21) Appl. No.: 14/754,538

(22) Filed: Jun. 29, 2015

(65) Prior Publication Data

US 2016/0021216 A1    Jan. 21, 2016

Related U.S. Application Data

(60) Provisional application No. 62/019,131, filed on Jun. 30, 2014.

(51) Int. Cl.
*G06F 15/16* (2006.01)
*B64G 5/00* (2006.01)
*B64G 3/00* (2006.01)

(52) U.S. Cl.
CPC ....... *B64G 5/00* (2013.01); *B64G 3/00* (2013.01)

(58) Field of Classification Search
CPC ....................................................... B64G 3/00

USPC ........................................................ 709/203
See application file for complete search history.

(56) References Cited

U.S. PATENT DOCUMENTS

| | | | | |
|---|---|---|---|---|
| 6,002,916 A * | 12/1999 | Lynch | ............... | H04B 7/18578 455/12.1 |
| 6,058,307 A * | 5/2000 | Garner | ............... | H04B 7/18539 455/12.1 |
| 6,915,238 B2 * | 7/2005 | Watts | ................. | H04B 7/18519 702/188 |
| 7,133,377 B1 * | 11/2006 | Mullins | ............. | H04B 7/18534 370/321 |
| 7,386,310 B2 * | 6/2008 | Dai | .................... | H04B 7/18513 455/10 |
| 7,707,315 B2 * | 4/2010 | Stultz | ..................... | H04L 29/06 709/246 |
| 7,783,734 B2 * | 8/2010 | Giffin | ................ | H04B 7/18578 709/219 |
| 7,856,232 B2 * | 12/2010 | Nasta | ................. | H04B 7/18519 455/427 |

(Continued)

*Primary Examiner* — Melvin H Pollack
(74) *Attorney, Agent, or Firm* — Lorenz & Kopf, LLP (57) ABSTRACT

Systems, processes and devices process telemetry, tracking and control (TT&C) data received from a satellite. A data acquisition system receives data packets comprising the TT&C data received from the satellite from one or more cortexes. A data extractor node (DEN) directs the decommutation of the received TT&C data in real time as the TT&C data is received. The decommutated TT&C data from the data acquisition system is stored in a database for subsequent processing. The data extractor node obtains requested TT&C data from the database and processes the obtained portion of the decommutated TT&C data in real time.

17 Claims, 4 Drawing Sheets

(56) References Cited

U.S. PATENT DOCUMENTS

| | | | | |
|---|---|---|---|---|
| 7,856,294 B2* | 12/2010 | Van Gaasbeck | ....... | G05B 15/02 |
| | | | | 701/2 |
| 7,904,243 B2* | 3/2011 | Cohen | ..................... | G01S 19/06 |
| | | | | 342/350 |
| 7,974,744 B2* | 7/2011 | Doan | .................. | G06F 11/3696 |
| | | | | 340/870.01 |
| 8,155,391 B1* | 4/2012 | Tang | .................... | G06K 9/0063 |
| | | | | 382/113 |
| 8,498,760 B2* | 7/2013 | Kaas | ........................ | B64G 1/24 |
| | | | | 342/355 |
| 8,654,610 B2* | 2/2014 | Megdal | ................ | G01S 5/0045 |
| | | | | 367/117 |
| 8,659,469 B2* | 2/2014 | Fukunaga | ............... | G01C 11/00 |
| | | | | 342/175 |
| 9,055,030 B2 | 6/2015 | Field et al. | | |
| 9,147,132 B2* | 9/2015 | Marchisio | | |
| 9,224,192 B2* | 12/2015 | Vajen | ..................... | G06T 5/002 |
| 9,224,218 B2* | 12/2015 | Pahwa | .................. | G06T 11/203 |
| 9,473,578 B2* | 10/2016 | Gopal | ................ | H04B 7/2041 |
| 2010/0076909 A1 | 3/2010 | Suri et al. | | |
| 2010/0269143 A1* | 10/2010 | Rabowsky | ......... | H04B 7/18591 |
| | | | | 725/63 |
| 2011/0252337 A1 | 10/2011 | Pignataro et al. | | |
| 2014/0105100 A1* | 4/2014 | Tronc | ................ | H04B 7/18513 |
| | | | | 370/321 |
| 2015/0046512 A1 | 2/2015 | Ashby et al. | | |
| 2015/0318916 A1* | 11/2015 | Gopal | ................ | H04B 7/18519 |
| | | | | 455/13.1 |
| 2016/0011318 A1* | 1/2016 | Cohen | ..................... | G01S 19/05 |
| | | | | 342/357.26 |
| 2016/0306824 A1* | 10/2016 | Lopez | .................. | G06T 3/4092 |

* cited by examiner

SATELLITE TELEMETRY, TRACKING AND CONTROL DATA TRACKING AND ARCHIVING SYSTEM

PRIORITY CLAIM

This application claims priority to U.S. Provisional Application Ser. No. 62/019,131, which was filed on Jun. 30, 2014 and which is incorporated herein by reference.

TECHNICAL FIELD

The following discussion generally relates to telemetry, tracking and control (TT&C) data for satellites. More particularly, the following relates to systems, devices and methods for tracking, archiving and otherwise processing TT&C data for one or more satellites.

BACKGROUND

Satellites and other spacecraft generate a large amount of telemetry, tracking and control (TT&C) data. Such data typically includes sensor data (e.g., temperatures, pressures, voltages and the like), data collected by scientific instruments, data related to the command and control of the satellite (e.g., adjustments to attitude or altitude), event messages (e.g., OOLs or other command data), and/or other data as desired. Modern satellites often record TT&C data for thousands, or even tens of thousands, of data points.

TT&C data for each of the monitored points on the satellite is typically received at a relatively high frequency, and this data is generally stored for the lifetime of the satellite, which is often on the order of five or more years. The amount of TT&C data to be collected and maintained, then, can occupy a substantial amount of mass storage, and can be very unwieldy to process. Simple data queries can readily consume substantial processing resources due to the sheer volume of data that is maintained for each spacecraft. This problem is compounded for operators of multiple satellites, since large volumes of data are maintained for each spacecraft.

It is therefore desirable to provide improved systems and processes for storing and processing TT&C data for one or more spacecraft. Various desirable features and characteristics will become apparent from the subsequent detailed description and the appended claims, taken in conjunction with the accompanying drawings and this background section.

BRIEF DESCRIPTION

Various embodiments provide systems, methods and devices to efficiently process TT&C data for one or more satellites or other spacecraft. Received TT&C data is de-commutated and pre-processed prior to storage in a database that permits efficient retrieval and subsequent processing of particular data. Various embodiments are therefore able to efficiently respond to subsequent user requests for reports, statistics and other information.

Various example embodiments provide a data processing system to process telemetry, tracking and control (TT&C) data received from a satellite. The data processing system suitably comprises a data acquisition system, a data extractor node (DEN) and a database. The data acquisition system and data extractor nodes are both computer systems implemented with computing hardware, software and input/output interfaces; the database may be similarly implemented using computing hardware and software resources. The data acquisition system is programmed or otherwise configured to receive data packets from one or more cortexes. The data packets comprising the TT&C data received from the satellite. The data extractor node is programmed or otherwise configured to decommutate the received TT&C data in real time as the TT&C data is received. The database is programmed or otherwise configured to receive the decommutated TT&C data from the data acquisition system and to store the decommutated TT&C data for subsequent processing. The data extractor node is further programmed to receive a request from a client device and, in response to the request, to obtain a portion of the decommutated TT&C data indicated by the request from the database, and to process the obtained portion of the decommutated TT&C data in real time to thereby respond to the request.

Other example embodiments provide methods of processing telemetry, tracking and control (TT&C) data from a satellite by a data extractor node having a processor and memory. The example methods suitably comprise receiving data packets comprising the TT&C data received from the satellite; decommutating the received TT&C data in real time as the TT&C data is received; storing the decommutated TT&C data in a database for subsequent processing; and, in response to a request received from a client system, to obtain a portion of the decommutated TT&C data indicated by the request from the database, and to provide the portion of the decommutated TT&C data obtained from the database to the client system in real time to thereby respond to the request.

Other example embodiments relate to systems, devices, methods and other processes substantially as described herein.

BRIEF DESCRIPTION OF THE DRAWING FIGURES

Example embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments provide systems, methods and devices to process TT&C data for one or more spacecraft, such as satellites that orbit the earth. Received TT&C data is de-commutated and pre-processed prior to storage in a SQL or similar database. More particularly, the TT&C data is stored in a structured database format that permits efficient retrieval and subsequent processing of particular data, thereby avoiding the additional processing to extract and format the data at a later date that was typically found in the prior art. Various embodiments are therefore able to respond to user requests for reports, statistics and other information in real time (or near real time, accounting for delays inherent in data processing and transmission), without placing an undue processing burden on the data storage and retrieval hardware.

Figure 1:
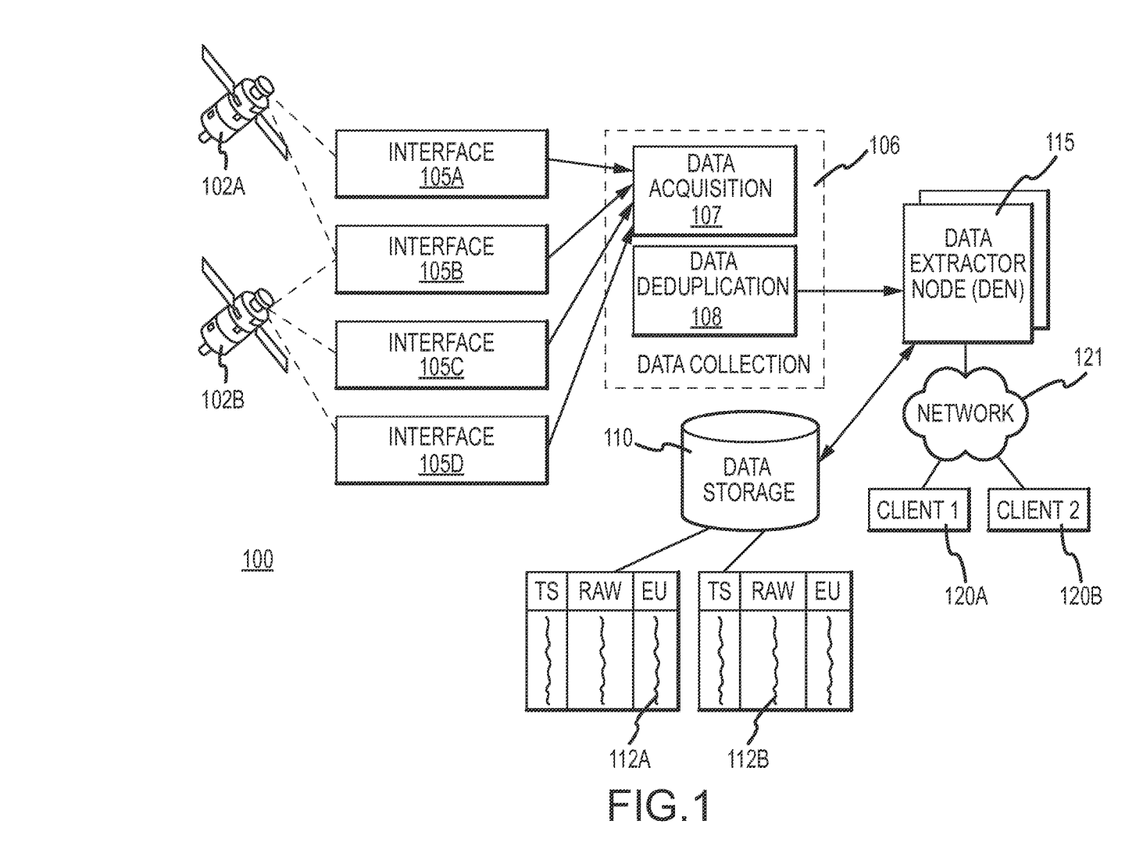
FIG. 1 is a block diagram of an example TT&C data processing system.

FIG. 1 shows an example system 100 for processing TT&C data associated with one or more spacecraft 102A-B. Spacecraft 102A-B may represent any number of satellites, manned or unmanned spacecraft, and/or other aerospace vehicles as desired. Systems 100 may be formulated to work with single spacecraft 102, or any number of simultaneously-active spacecraft 102A-B as appropriate.

Each spacecraft 102A-B collects TT&C data for reporting to system 100 on any regular or irregular temporal basis. In various embodiments, circuitry onboard each craft 102 receives sensor data and the like, formats the received data into appropriate data frames, and transmits the formatted data frames to terrestrial antennas located on the earth. As shown in FIG. 1, TT&C data initially enters system 100 in data frames formatted by the craft 102A-B that are received via one or more interfaces 105A-D. Each interface 105 communicates with a terrestrial antenna that receives raw data from one or more spacecraft 102A-B. Examples of suitable interfaces 105A-C could include the CORTEX products available from Zodiac Data Systems of Alpharetta, Ga., although other embodiments could be formulated with any number of different products. Interfaces 105A-D do not necessarily correspond to particular spacecraft 102A-B. Some spacecraft 102A-B may provide data to system 100 via multiple interfaces 105A-D for redundancy, bandwidth allocation and/or other purposes. Additionally, certain interfaces 105A-D may be shared between different spacecraft 102A-B, as shown in FIG. 1.

Decommutation of TT&C data typically involves extracting the useful data from a received data frame for subsequent processing. In one embodiment, the data frames received from the interfaces 105A-D each hold about 256 bytes or so of data representing about 200 or so different data points, although other embodiments may organize the data in any other manner, and it is not necessary that all data frames processed within system 100 conform to the same parameters or specifications. Traditionally, decommutation of TT&C data was performed only on demand to avoid storing large amounts of unneeded data. This limited the amount of data that was available at any given time, and made statistical analysis (e.g., calculation of average values) relatively difficult, since the full breadth of collected data was not readily available for processing. In contrast to prior systems that decommutated the data on demand, various embodiments are able to decommutate the data frames in real time as they are received to extract useful TT&C data for storage in database 110. By storing de-commutated data, additional reports, metrics and other features are enabled.

To that end, FIG. 1 shows a data collection system 106 that includes one or more subsystems for data acquisition 107 and data merging/deduplication 108, as described more fully below. In various embodiments, data collection system 106 is a computer system (having suitable processor, memory and input/output interfaces) to receive the received TT&C data under the direction of DEN 115 to place the data in a format suitable for further processing by DEN 115 prior to storage in database 110. Data collection system 106 and/or DEN 115 can recognize data for a particular spacecraft 102A-B based upon spacecraft identifiers, processor identifiers, mode identifiers and/or other information contained with the data frames themselves. If one or more interfaces 105A-D are uniquely associated with a spacecraft, then equivalent embodiments could recognize data based upon the interface 105A-D that provides the data, as desired. In various embodiments, redundant data frames (e.g., identical frames received on multiple interfaces 105A-D) can be identified and removed by deduplication module 108 to eliminate unnecessary duplicate processing, as desired.

Received data frames are passed from data collection system 106 to a data extractor node (DEN) 115 for decommutation and/or other processing as desired. In various embodiments, the DEN 115 is a computer system having conventional processing, memory and input/output resources. DEN 115 is appropriately programmed or otherwise configured to extract the TT&C data contained within the identified frame and to store the extracted data in database 110. Data can be recognized according to known formats of the received data frame. That is, data frames will typically provide data in known bit/byte orders and in known formats. Often, TT&C data is packaged by the spacecraft in a predetermined order, with each byte (or word) representing one or more data values. In various embodiments, interface 105 adds a timestamp to each frame to indicated the time at which the frame was received.

In various embodiments, data collection system 106 and/or DEN 115 are additionally programmed or otherwise configured to format the TT&C data in accordance with known data formats. For example, a raw binary value known to represent a temperature reading or the like could be converted to a floating point or other numerical representation that is more useful for reporting. Data collection system 106 and/or DEN 115 may recognize additional engineering unit (EU) formats such as switch types, floating point numbers, integers and the like. TT&C data can therefore be processed in real time upon receipt (or shortly after receipt) so that the raw binary values contained in the data frame are converted to EU or other useful values prior to storage. This provides a substantial advantage in comparison to prior embodiments that stored the raw data because the processed values are more suitable for report generation, statistical analysis and the like.

Database 110 is a structured query language (SQL) or other database that is programmed to store the decommutated TT&C data received from the data collection module 106. In various embodiments, database 110 is an object-oriented or other relational database that is stored in conventional computing hardware and that is executed through conventional database backend software executing on conventional computing hardware. Suitable database hardware and software systems are available from the Oracle Corporation of Redmond City, Calif., Microsoft Corporation of Redmond, Wash., and/or from many other commercial vendors.

Decommutated data may be stored in database 110 in any format. In an example embodiment, database 110 is organized with separate tables 112A-B for each data point. Each table may be indexed by a timestamp (e.g., the timestamp provided by interface 105 indicating when the frame containing the data point was received), or by any other value. In the example tables shown in FIG. 1, each table 112 stores raw data and the decommutated value ("Engineering Units" (EU)) for each data point, indexed by timestamp. Other embodiments could store additional or different data for each point, could differently index each table 112, and/or could arrange the data into different table formats, as desired.

Data extractor node (DEN) 115 is a computing system executing on conventional hardware resources (e.g., processor, memory, input/output interfaces) that is programmed or otherwise configured to respond to queries received from one or more client systems 120A-B. In various embodiments, DEN 115 performs the decommutation of received data and acts as the interface to database 110, as described more fully below. Indeed, DEN 115 may be programmed in some implementations to be the only node that has access to database 110 for security purposes. That is, limiting access to database 110 to only DEN 115 could make access by unauthorized users more difficult.

DEN 115 can also be programmed or otherwise configured to respond to queries in real time by obtaining requested data from database 110 and/or by formatting the obtained data to create reports, graphs, statistics and other information requested by human operators/users. In various embodiments, DEN 115 includes a suitable web interface or application program interface (API) so that users of client devices 120A-B are able to access DEN 115 via a network 121 to posit queries and to receive responses. Such queries could include, for example, a report of values received for a particular data point over a defined period of time; an average value of the value over a predetermined period of time; a prediction of when the value may cross a threshold value; and/or any other information as desired. Queries could also request simultaneous or combined reports of multiple data points, or statistics based upon multiple data points (e.g., average reading of multiple sensors). Other embodiments could allow client devices 120A-B to remain in contact with DEN 115 to receive real-time data as it is received, as desired.

Client devices 120A-B may include a client application or the like that manages connections to DEN 115 and that formats and presents output reports (e.g., generating graphs, tables and the like) as desired. Client devices 120 may be personal computers, mobile phones, tablet computers or other digital computing devices as desired. Client devices 120 may communicate with DEN 115 via a web interface, API, or other technique as desired. In some implementations, communications with DEN 115 are protected with cryptography or other secure access mechanisms. Particular users may be authenticated in any manner (e.g., userid/password credentials) prior to receiving data from DEN 115. Other secure access mechanisms (e.g., router access controls, VPNs and/or the like) may also be present to further secure the data stored in database 110.

Figure 2:
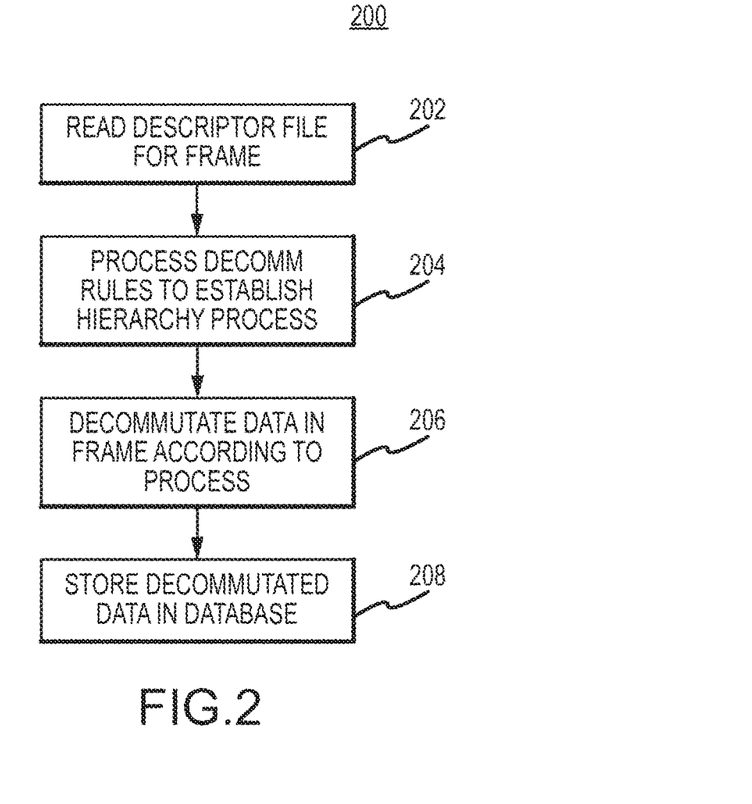
FIG. 2 is a diagram of an example process for handling TT&C data in a data processing system.

FIG. 2 shows a process flow diagram of an example process 200 in which data is received and processed within system 100. The various functions shown in FIG. 2 may be performed by software, firmware or other programmable instructions stored within and executed by the various components of FIG. 1, as appropriate. In various embodiments, the functions of process 200 are performed by DEN 115, although other embodiments could perform some or all of the functions using data collection module 106, client device 120, and/or other processing resources as desired.

Referring now to FIG. 2, DEN 115 suitably determines how to decommutate the data points represented in a received data frame by processing a descriptor file or the like (function 202). The descriptor file typically describes the contents of the data frame by setting forth the locations of various data points within the frame. The descriptor file may additionally that specifies any other parameters (e.g., a sampling frequency of the point indicating whether that data is present in this particular data frame or not), and any dependencies upon other data points for decommutation.

To that end, the DEN 115 suitably identifies a hierarchy (e.g., a "tree" or the like) in which to decommutate the data points contained within the received frame (function 204). In various embodiments, the first data points to be decommutated will be those that do not depend on any other decommutated data points. Any dependencies can be resolved by first processing the points that do not have dependencies, followed by points that can be decommutated using already-decommutated data, and so on. Some data points may be dependent upon five or more data points in some implementations, so processing resources can be conserved by identifying and pre-decommutating the needed points prior to processing the dependent point (function 206). Since many embodiments will ultimately decommutate all of the received data in the frame for storage in database 110 (function 208), the decommutation process can be streamlined by recognizing such dependencies and then decommutating according to the determined process.

The general process 200 shown in FIG. 2 may be supplemented or modified in any manner. In various embodiments, DEN 115 directs processing by multiple processing nodes, as desired. These different nodes can use parallel processing techniques to expedite real-time processing and storage of received data.

In practice, it can be a challenge to generate a useful plot of TT&C and other types of data due to the sheer volume of data that can be collected. In many cases, it can be difficult to plot all of the data in a large data set accurately. At the very least, the amount of computing time and resources that would ordinarily be allocated to processing a large data set can be substantial, possibly leading to user frustration.

Figure 3:
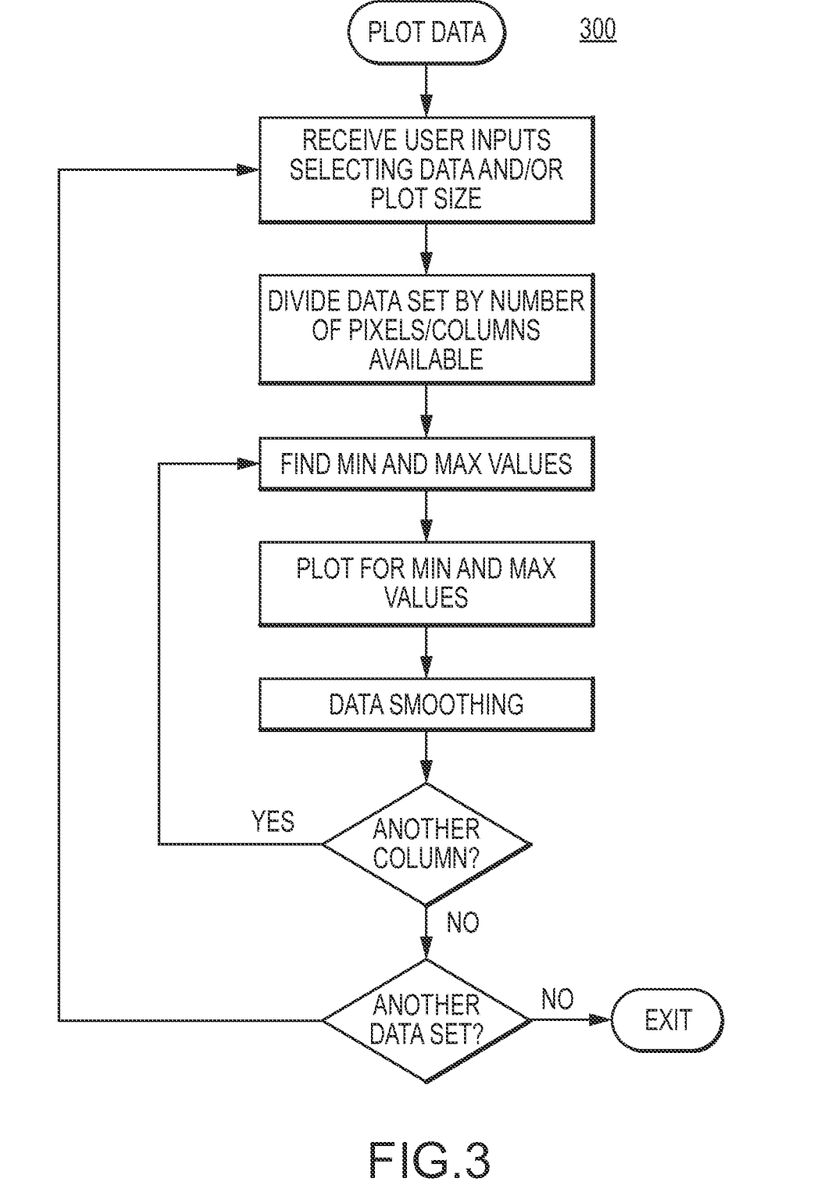
FIG. 3 describes an example of a process that could be performed by a data extractor node and/or by a client device to create graphical reports based upon TT&C or other data.

FIG. 3 describes an example of a process 300 to efficiently create useful graphical reports based upon TT&C or other data. The example process 300 could be implemented in software stored in memory or disk storage and executed by any processor, such as a processor associated with the client device 120 or the like. Other embodiments could execute equivalent processes on the DEN 115, on other hardware, and/or in any other conventional computing or data processing environment. The process described in FIG. 3 could be equivalently applied to other data processing applications other than telemetry/TT&C data, as desired.

To begin the plotting process 300, the data processing system suitably receives user inputs (function 302) that identify one or more data points or other parameters to plot. User inputs may also define the size of the plot in some embodiments, although other embodiments may use default or other hardcoded values for the plot window size, as appropriate. Data may be obtained as needed. In some embodiments relating to telemetry data, the client system 120 could place a query to DEN 115 that identifies one or more telemetry points. DEN 115 then acquires the appropriately decommutated data from storage 110 or another source. DEN 115 may return the full data values for the requested point(s) to the client system 120 in some embodiments. DEN 115 could equivalently return only those values that are expressly needed for further processing by the client system 120 (e.g., minimum and maximum values) for each data point, as desired.

Data values are appropriately grouped according to time or another independent ("X axis") value (function 304). In various embodiments, the client system 120 appropriately recognizes the resolution of data to be presented based upon available space, display resolution, and/or other factors as desired. A certain number of pixels, for example, may limit the resolution of any displayed plot. If the display space only has room for several hundred pixels, for example, then data sets having thousands of data values may need to be combined for better resolution. To that end, the data set can be grouped into "buckets" or "columns" of contiguous data values for common analysis. If a data set has a thousand regularly-spaced data points but only a hundred display pixels, for example, then the data set could be grouped into sets of ten contiguous data points for further analysis. "Columns" could be formed according to any regular or irregular interval, as desired. Data measurements obtained across minutes, hours, days, weeks, months or even years could be inter-grouped for further analysis to provide the level of resolution desired by the user and supported by the processing environment. In the example shown in FIG. 4, each column represents a segment of time. Equivalent embodiments, however, could divide the columns into segments representing other factors such as spatial dimensions or any other independent variables, as desired.

Within each segment/column, the maximum and minimum data values are identified (function 306). Minimum and maximum values maybe determined from the DEN 115 and/or database 110 in some embodiments. In other embodiments, however, the client system 120 identifies maximum and minimum values for each segment/column group based upon data received from the DEN 115.

These maximum and minimum values for each data segment will typically define the limits of plotted values in each column of the resulting plot (function 308). In practice, a graphics routine or the like may simultaneously create the entire graphical plot after any smoothing 310 or other processing is complete. Conceptually, however, it can be helpful to consider that the limits of each column are initially defined by the maximum and minimum values of the data that were observed within the time frame or other "window" corresponding to that column. In many embodiments, pixels lying between the minimum and maximum values will also be activated to represent the range of data observed.

The plot of observed values may be smoothed or otherwise processed to create more attractive or useful imagery (function 310). In various embodiments, it may be desirable to activate certain pixels to create a continuous line or other shape for the data. Pixels to be selected for smoothing could be identified in any manner. In one example, it may be desirable to ensure that contiguous columns activate at least one or more common pixels to provide a continuous plot line. To that end, any pixels lying between the minimum value of the previous column and the maximum value of the current column could be activated, thereby insuring at least some continuity between columns. Similarly, any pixels lying between the maximum value of the previous column and the minimum of the current column could be activated, if desired, to ensure at least some overlap. Still other embodiments could ensure that any pixels lying on a line drawn between the minimum pixel of the prior column and the maximum pixel of the current column (or vice versa) are activated. Other embodiments could use linear regression or other data smoothing techniques, as desired.

As noted above, minimum and maximum values (and any pixels lying therebetween) can be plotted for any number of columns representing any number of time periods or other data groupings. Functions 306, 308, 310 may therefore be repeated any number of times (function 312) as needed for any number of columns (function 312). Similarly, process 300 may be repeated for any number of data sets (function 314). Different data sets could be represented on a common plot (e.g., with differently colored lines), and/or separate plots could be generated.

The specific process 300 shown in FIG. 3 may be modified in any number of practical implementations to take advantage of available processing resources. As noted above, some embodiments may graphically generate the various pixels of the output plot at one time, for example, after all of the data points have been identified. A graphics processing routine, for example could receive all of the data points in a bitmap or similar format so that the output plot is generated at one common time. Also, as noted above, various embodiments could implement process 300 primarily using computing resources of DEN 115; in such embodiments, the completed graph or plot could be provided to the client device 120 as a bitmap or other graphical representation to be rendered for display to the viewer by the client device 120.

Figure 4:
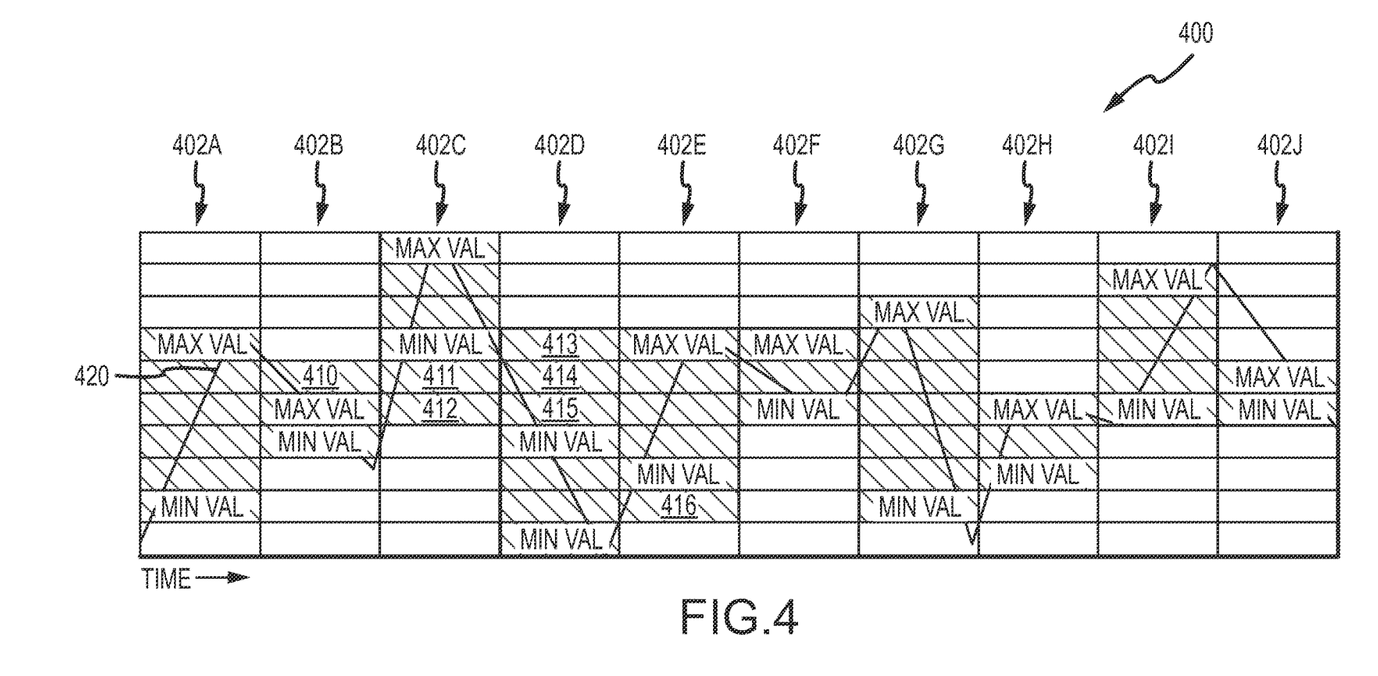
FIG. 4 describes an example of a graphical report based upon TT&C or other data.

An example of a plot 400 constructed using process 300 is shown in FIG. 4. As illustrated in FIG. 4, a number of different columns 402A-J each represent different periods of time in which data has been collected. As noted above, each column 402 could represent a period of time, for example, in which dozens, hundreds or even more data points have been collected. The particular number of columns 402 corresponds to the resolution of the data to be displayed; this number may be selected by the user, as noted above, and/or determined by the client device 120 based upon the available space for the output plot and/or any other factors, as desired.

The minimum and maximum values for each column 402A-J are identified and plotted, as noted above. Generally speaking, each row of the plot 400 will correspond to a particular value of the data points. Pixels in rows representing such values may be activated or deactivated as desired to convey the values of the underlying data. In the example shown in FIG. 4, the pixels corresponding to the maximum and minimum data points observed for each column are activated. Any pixels lying between the maximum and minimum values for the column are also activated; these intervening pixels may be activated with the same color and texture as the maximum and minimum values, or they may be shown with different color and/or texture, as desired.

In the example shown in FIG. 4, several pixels 410-416 have been activated for "smoothing" of the plot imagery. As noted above, the particular pixels that are activated for smoothing could be selected in any manner. In a simple embodiment, any pixels lying between the limits of adjoining columns could be activated to ensure continuity of the line or other image. Pixel 410, for example, could be activated to provide continuity between columns 402B and 402C, whereas pixels 411 and 412 (and/or pixels 414 and 415) could be activated to provide continuity between columns 402C and 402D. Additional pixels could be activated, as desired, to provide additional overlapping and therefore better smoothing, albeit at the possible expense of data accuracy. Other embodiments could simply activate all of the pixels lying on a line 420 that interconnects the maxima and minima of adjoining columns 402. This line 420 could be created through conventional linear regression techniques, and/or the like.

Again, data points retained in database 110 may be retrieved and/or displayed in any manner, including any formats that differ from those described in FIGS. 3-4. Similarly, the plotting process shown in FIGS. 3-4 could be applied to any number of other environments in addition to satellite TT&C data. The particular display techniques described in FIGS. 3-4 may have particular usefulness in TT&C implementations, however, because they conveniently and accurately represent the large data sets that can be maintained within the TT&C environment.

According to various embodiments, then, a satellite telemetry, tracking and control system provides a far more efficient and robust system than was previously available.

Any number of additional enhancements, modifications and variations may be deployed in a wide array of alternate but equivalent embodiments.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A data processing system to process telemetry, tracking and control (TT&C) data received from a satellite, the data processing system comprising:
   a data acquisition system programmed to receive data packets from one or more cortexes, the data packets comprising the TT&C data received from the satellite;
   a data extractor node programmed to read a descriptor file that describes the contents of the received data packets, to determine a processing order for decommutating the TT&C data, and to decommutate the received TT&C data according to the determined processing order in real time as the TT&C data is received; and
   a database programmed to receive the decommutated TT&C data from the data extractor node and to store the decommutated TT&C data for subsequent processing;
   wherein the data extractor node is further programmed to receive a request from a client device and, in response to the request, to obtain a portion of the decommutated TT&C data indicated by the request from the database, and to process the portion of the decommutated TT&C data obtained from the database in real time to thereby respond to the request.

2. The data processing system of claim 1 wherein the data extractor node responds to the request by providing real time TT&C data to the client.

3. The data processing system of claim 1 wherein the data extractor node comprises a first processor, a first memory and first input/output interfaces programmed to communicate with the data acquisition system, the client device and the database.

4. The data processing system of claim 3 wherein the data acquisition system comprises a second processor, a second memory and second input/output interfaces programmed to communicate with the data extractor node.

5. The data processing system of claim 1 wherein access to the database is limited to only the data extractor node.

6. The data processing system of claim 1 wherein the client device is programmed to provide a graphical representation of the TT&C data received from the data extractor node on a display associated with the client device.

7. The data processing system of claim 6 wherein the client device is programmed to provide the graphical representation on the display as a plot having a plurality of columns, each column representing a portion of the data received from the data extractor node corresponding to a period of time, wherein each column presents a maximum value and a minimum value of the data during the period of time.

8. The data processing system of claim 7 wherein the client device is further programmed to smooth the graphical representation presented on the display by activating additional pixels of the display lying outside of the maximum and minimum values to ensure continuity between adjacent columns.

9. The data processing system of claim 8 wherein the client device identifies the additional pixels of the display by performing a linear regression that connects the maximum and minimum values of adjacent columns.

10. A method of processing telemetry, tracking and control (TT&C) data from a satellite by a data extractor node having a processor and memory, the method comprising:
    receiving data packets comprising the TT&C data received from the satellite;
    reading a descriptor file that describes the contents of the received data packets to determine a processing order for decommutating the TT&C data;
    decommutating the received TT&C data according to the determined processing order in real time as the TT&C data is received;
    storing the decommutated TT&C data in a database for subsequent processing; and
    in response to a request received from a client system, obtaining a requested portion of the decommutated TT&C data indicated by the request from the database, and providing the portion of the decommutated TT&C data obtained from the database to the client system in real time to thereby respond to the request.

11. The method of claim 10 wherein access to the database is limited to only the data extractor node.

12. The method of claim 10 wherein the client system present the TT&C data received from the database user as a graphical representation on a display.

13. The method of claim 12 wherein the client system generates the graphical representation as a plot having a plurality of columns on the display, each column representing a portion of the data corresponding to a period of time, wherein each column displays a maximum value and a minimum value of the data observed during the period of time.

14. The method of claim 13 wherein client system is further programmed to smooth the graphical representation on the display by activating additional pixels lying outside of the maximum and minimum values to ensure continuity between adjacent columns.

15. The method of claim 14 wherein the client system identifies the additional pixels by performing a linear regression that connects the maximum and minimum values of adjacent columns.

16. The method of claim 10 wherein the requested portion of the decommutated TT&C data indicated by the request comprises decommutated TT&C data that was collected from multiple data packets that were separately received over a period of time.

17. The method of claim 16 further comprising computing an average of the decommutated TT&C data collected over the period of time.

* * * * *